(12) United States Patent
Leonard (10) Patent No.: US 7,959,138 B2
(45) Date of Patent: Jun. 14, 2011

(54) AIR SPRING ASSEMBLY WITH NON-THREADED CONNECTION

(75) Inventor: Joshua R. Leonard, Noblesville, IN (US)

(73) Assignee: BFS Diversified Products, LLC, Indianapolis, IN (US)

(*) Notice: Subject to any disclaimer, the term of this patent is extended or adjusted under 35 U.S.C. 154(b) by 59 days.

(21) Appl. No.: 12/364,606

(22) Filed: Feb. 3, 2009

(65) Prior Publication Data
US 2009/0179359 A1  Jul. 16, 2009

Related U.S. Application Data

(63) Continuation of application No. 11/137,812, filed on May 24, 2005, now abandoned.

(51) Int. Cl.
*F16F 9/05* (2006.01)
(52) U.S. Cl. .......... 267/64.27; 267/35; 267/122
(58) Field of Classification Search .......... 267/64.19, 267/64.23, 64.24, 64.27, 64.28, 35, 122; 280/124.157, 124.158, 124.159; 73/756; 403/329, 397, DIG. 14
See application file for complete search history.

(56) References Cited

U.S. PATENT DOCUMENTS

| | | | |
|---|---|---|---|
| 3,081,075 A | 3/1963 | Selman | |
| 3,476,136 A * | 11/1969 | Weisgerber | 285/35 |
| 3,727,899 A | 4/1973 | Pemberton | |
| 4,146,254 A | 3/1979 | Turner et al. | |
| 4,174,827 A | 11/1979 | Hirtreiter et al. | |
| 4,304,426 A | 12/1981 | Francis | |
| 4,621,796 A | 11/1986 | Fresch et al. | |
| 4,715,107 A | 12/1987 | Fresch et al. | |
| 4,733,692 A | 3/1988 | Kotake et al. | |
| 5,068,496 A | 11/1991 | Favalora et al. | |
| 5,314,045 A | 5/1994 | Fenn et al. | |
| 5,342,139 A * | 8/1994 | Hoffman | 403/DIG. 14 |
| 5,468,028 A | 11/1995 | Olson | |
| 5,518,225 A | 5/1996 | Gubitz | |
| 5,588,640 A | 12/1996 | Romer | |
| 5,648,615 A * | 7/1997 | Jeske et al. | 73/756 |
| 5,681,061 A | 10/1997 | Olson | |
| 6,036,179 A * | 3/2000 | Rensel | 267/64.28 |
| 6,170,887 B1 | 1/2001 | Salomon-Bahls et al. | |
| 6,332,602 B1 | 12/2001 | Oishi | |
| 6,454,248 B2 | 9/2002 | Pradel | |
| 6,457,702 B1 | 10/2002 | Oishi | |
| 6,539,786 B1 * | 4/2003 | Daly | 73/114.32 |
| 6,554,323 B1 | 4/2003 | Salomon-Bahls et al. | |
| 7,707,892 B2 * | 5/2010 | Fujimoto | 73/756 |
| 2001/0024004 A1 | 9/2001 | Pradel | |
| 2003/0218280 A1 | 11/2003 | Morow | |

FOREIGN PATENT DOCUMENTS

| | | |
|---|---|---|
| EP | 0 978 593 A | 2/2000 |
| EP | 0 821 192 B | 11/2004 |
| FR | 2 732 455 A | 10/1996 |
| JP | 03164366 A * | 7/1991 |
| JP | 03177633 A * | 8/1991 |
| WO | WO 92/11484 A | 7/1992 |

OTHER PUBLICATIONS

Parker Hannifin Corporation, Cartridges & Manifolds catalog, pp. 1-12.

* cited by examiner

*Primary Examiner* — Thomas J Williams
(74) *Attorney, Agent, or Firm* — Sarah M. Jabbari; Fay Sharpe LLP (57) ABSTRACT

A connector fitting and air spring assembly includes a connector fitting supported on an end member of an air spring. The connector fitting is secured on the air spring by a retaining member engaging the end member of the air spring.

13 Claims, 10 Drawing Sheets

AIR SPRING ASSEMBLY WITH NON-THREADED CONNECTION

This application is a continuation of U.S. patent application Ser. No. 11/137,812, filed on May 24, 2005, now abandoned which is hereby incorporated herein by reference in its entirety.

BACKGROUND

The present novel concept broadly relates to the art of fluid suspension devices and, more particularly, to an air spring assembly with a non-threaded interface adapted to connect or otherwise attach an associated component, such as an air line or a sensor.

The subject connector fitting finds particular application and use in association with air springs and vehicle suspension systems, and will be described herein with specific reference thereto. However, it is to be understood that the subject novel concept is amenable to broad use and, as such, is equally applicable in other suitable environments. Accordingly, it will be understood that the present novel concept is not intended to be limited to the uses and/or applications described herein, which are merely exemplary.

Most known compression fittings for fluid lines, as well as other multi-piece connectors of similar types, can be used to secure an air supply line to an air spring. In such arrangements, an end member of the air spring is normally provided with a threaded passage that provides communication with the spring chamber of the air spring. The compression fitting is then threaded into the passage. Once the fitting has been installed, the air line is connected thereto in a traditional manner. While such fittings tend to provide a relatively robust connection between the air line and the air spring, numerous problems nonetheless exist with these types of connections. For example, the threaded connection with the end member of the air spring can to provide a leak path, which undesirably increases air consumption and decreases system efficiency.

Additionally, compression-type fittings are often difficult and time consuming to install, especially in areas of limited clearance, such as between structural members and/or body panels of a vehicle, for example. Though the body of such a fitting can often be installed ahead of time, numerous other parts of the compression fitting and fluid line need to be arranged and manipulated after the air spring has been installed on the vehicle. This undesirably increases the time and effort required to install or replace an air spring of a vehicle suspension system.

What's more, the air line is usually secured in a fixed position on a compression fitting. That is, the air line is normally not permitted to move or rotate relative to the connector or air spring. Thus, the air line and/or fitting can become undesirably stressed due to the movements of the vehicle body. Additionally, such an arrangement could result in the air line being positioned against or otherwise contacting a structural member or the object. As a result, chaffing, abrasion or other degradation of the air line could occur. These conditions are disadvantageous and can lead to premature maintenance, repair and/or replacement of the air line and/or connector fitting.

Furthermore, the nature of the fitting and the need for the fitting body and other components to be accessible for the proper installation of the air line, requires that the majority of the fitting project or otherwise extend outwardly from the air spring. As a result, a certain minimum amount of peripheral clearance is needed for wrenches or other tools used during the connection of the air line. This external mounting arrangement also mandates that the fitting have a certain minimum length, which typically significantly increases the overall height of the air spring and fitting assembly. The disadvantage of the extra height is further increased where the end member of the air spring has an outwardly projecting boss into which the fitting body is threaded.

As an alternative to compression and other multi-piece fittings, so called "push-to-connect" (PTC) fittings have been developed and have been used in air spring applications. Generally, these types of connections provide for easier connection of the air line relative to compression fittings, and PTC fittings also typically permit the air line to rotate or swivel, which can reduce the stress on the air line and the fitting. Though PTC fittings have improved certain aspects of the air spring/air line connection, numerous disadvantages remain with the use of these types of connector fittings.

One example of such a disadvantage is that PTC fittings used heretofore have only minimally reduced to overall length of the fitting, if any reduction at all has been achieved. Thus, the portion of the fitting extending from the threaded connection undesirably increases the overall height dimension of the air spring. As a result, the foregoing clearance and other issues associated with this increased overall height remain unresolved by known PTC fittings.

A further disadvantage is that such PTC fittings remain threadably installed on the exterior of the end member of the air spring. Therefore, a threaded passage is normally required on the end member of the air spring and the resulting leakage issues, discussed above, remain unresolved. Additionally, loads from tension and movements of the air line, impacts from road debris and changing temperatures can all act to degrade the integrity of the threaded connection of both PTC and compression fittings. This is at least partly due to the installation of the fitting along the exterior of the air spring.

Regardless of the type, kind or configuration of threaded fitting that may be used, the provision and use of threads to connect an air line or sensor will have numerous disadvantages associated with such use. One disadvantage is simply the costs associated with machining the threads on the air spring part or parts. That is, substantially tight tolerances are normally maintained on the threaded features and, typically, higher costs are associated with holding tighter tolerances. For example, where the threaded part is to be plated or coated, such as for corrosion resistance, dimensional allowances should be provided on the threads to accommodate the plating or coating buildup that is to be later applied.

Furthermore, threaded connections can result in the deflection of parts or features which, in turn, can cause assembly or other problems. For example, air springs commonly use mounting studs projecting from a top or bead plate to secure the air spring to an associated structural member. One type of mounting stud is commonly referred to as a combination stud or fitting, and includes a central passage used to communicate with the spring chamber of the air spring. Typically, these so called combination fittings include both internal and external threads. A threaded connector fitting is typically secured along the threaded passage to connect the air line. To form a suitable fluid-tight connection, however, tapered threads, such as pipe threads, are normally used. As the fitting is tightened into the internal threads of the combination fitting, the same becomes outwardly deflected. As a result, the external threads become oversized, which can undesirably cause assembly problems.

BRIEF SUMMARY

A connector fitting is provided in accordance with the present novel concept that is adapted for use in securing an associated component of an associated vehicle suspension system on an associated air spring thereof. The associated air spring has an associated spring chamber formed between a spaced-apart pair of associated end members, with one of the associated end members having an associated outer wall, an associated inner wall and an associated passage wall defining an associated fitting passage in communication with the associated spring chamber. The connector fitting includes a fitting housing dimensioned to be received within the associated fitting passage of the associated end member. The connector fitting also includes a sealing member sealingly supported between the fitting housing and the associated passage wall, as well as a plurality of elongated retaining members extending from the fitting housing. The fitting housing includes an outer housing wall and an inner housing wall. The inner housing wall at least partially defines a housing passage extending through the fitting housing for supporting the associated component in communication with the associated spring chamber. The outer housing wall includes a radially outwardly extending support surface adapted to engage one of the associated outer wall and the associated passage wall of the associated end member. The plurality of retaining members include a first end extending from the fitting housing and a second end capable of resilient deflection. The second end includes a projection suitable for engaging one of the associated inner wall and the associated passage wall.

An air spring assembly is provided in accordance with the present novel concept that includes a first end member and a second end member in spaced relation to the first end member. The first end member including a first side, an opposing second side and a substantially smooth-walled fluid passage extending therethrough. The air spring assembly also includes a flexible wall secured between the first and second end members at least partially defining a fluid chamber in communication with the fluid passage. The air spring assembly also includes a connector fitting for retaining an associated fluid line in communication with the fluid chamber. The connector fitting is supported on the first end member along the fluid passage and includes a fitting body, a retaining collar, an inner support sleeve, a first sealing member and a second sealing member. The fitting body includes a support surface and a body wall at least partially defining a body passage. The fitting body is at least partially received in the fluid passage such that the support surface engages at least a portion of the first end member. The retaining collar is received in the body passage and is adapted to engage an associated exterior surface of the associated fluid line. The inner support sleeve is received in the body passage adjacent the retaining collar and is adapted to engage an associated interior surface of the associated fluid line. The first sealing member is compressively positioned between the fitting body and the first end member, and the second sealing member is disposed within the body passage and is compressively positioned between the fitting body and the associated exterior surface of the associated fluid line. The air spring assembly also includes a retaining member adapted to engage the first end member and retain the connector fitting thereon.

An air spring assembly is provided in accordance with the present novel concept that is adapted to receive an associated cartridge fitting suitable for securing an associated air line on the air spring assembly, which includes a first end member and a second end member. The first end member includes a first outer wall, an opposing first inner wall and an end member opening extending through the first end member. The first end member has a substantially uniform first end member thickness along the end member opening. The second end member includes a second outer wall and an opposing second inner wall. The second end member is spaced from the first end member and oriented such that the second inner wall is disposed toward the first inner wall. Additionally, the air spring assembly includes a flexible wall secured between the first and second end members that at least partially forms a spring chamber between the first and second inner walls thereof. A cartridge housing is secured along the first inner wall of the first end member within the spring chamber. The cartridge housing includes a housing passage extending therethrough. The housing passage is accessible through the end member opening for receiving the associated cartridge fitting.

DETAILED DESCRIPTION

Figure 1:
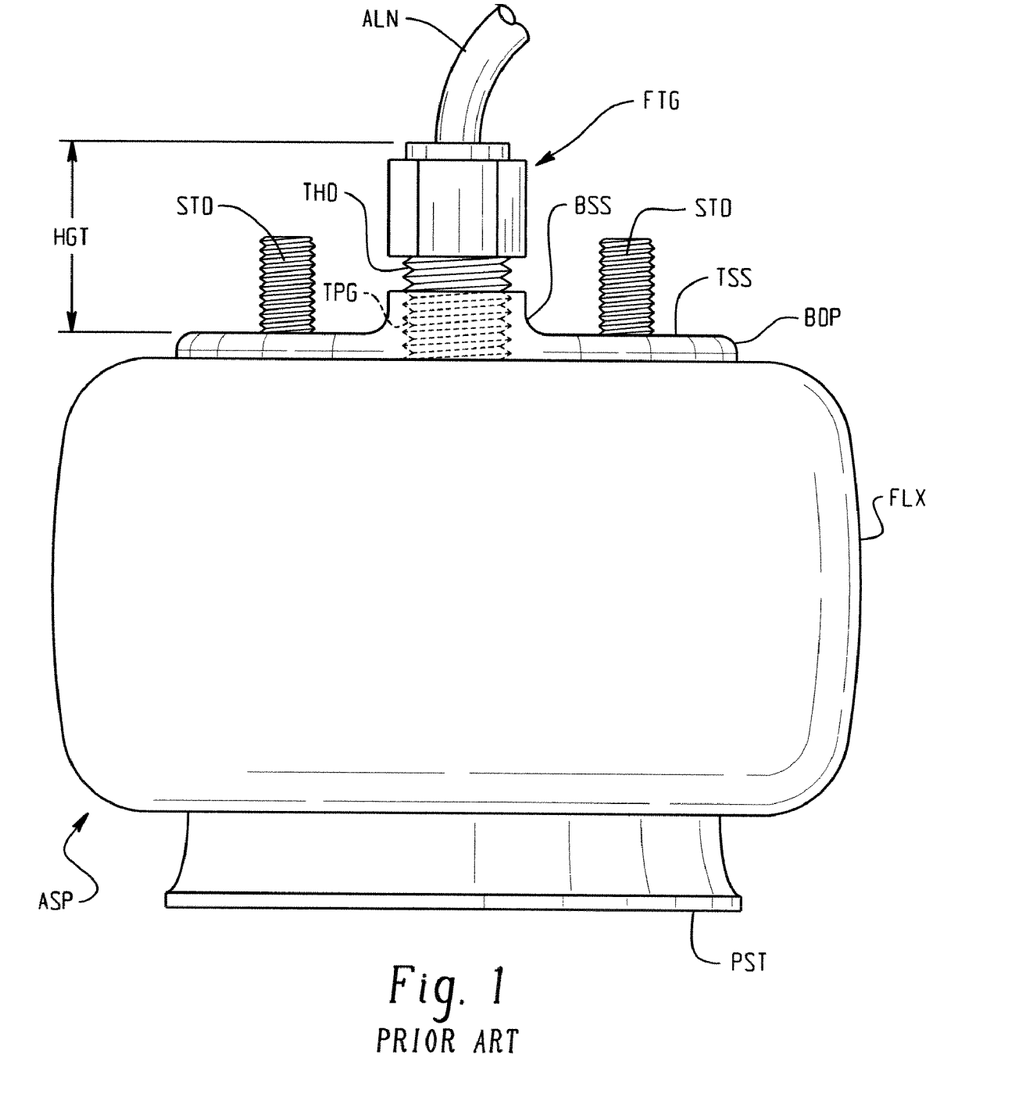
FIG. 1 is a side elevation view of a known air spring and fitting assembly.

FIG. 1 illustrates a known air spring ASP having a bead plate BDP, a piston PST spaced from the bead plate and a flexible wall FLX secured therebetween. Mounting studs STD project outwardly from bead plate BDP and are suitable for securing the air spring on a vehicle suspension component (not shown) in a typical manner. A boss BSS projects upwardly from a top surface TSS of the bead plate and includes a threaded passage TPG formed therethrough. A typical push-to-connect fitting FTG includes a threaded portion THD that threadably interengages the threaded passage. An air line ALN extends into fitting FTG and is captured therein in a known manner. As is apparent from FIG. 1, fitting FTG projects outwardly a substantial distance from top surface TSS, as indicated by dimension HGT. This can undesirably result in clearance, leakage and other issues, as discussed above in detail.

Figure 2:
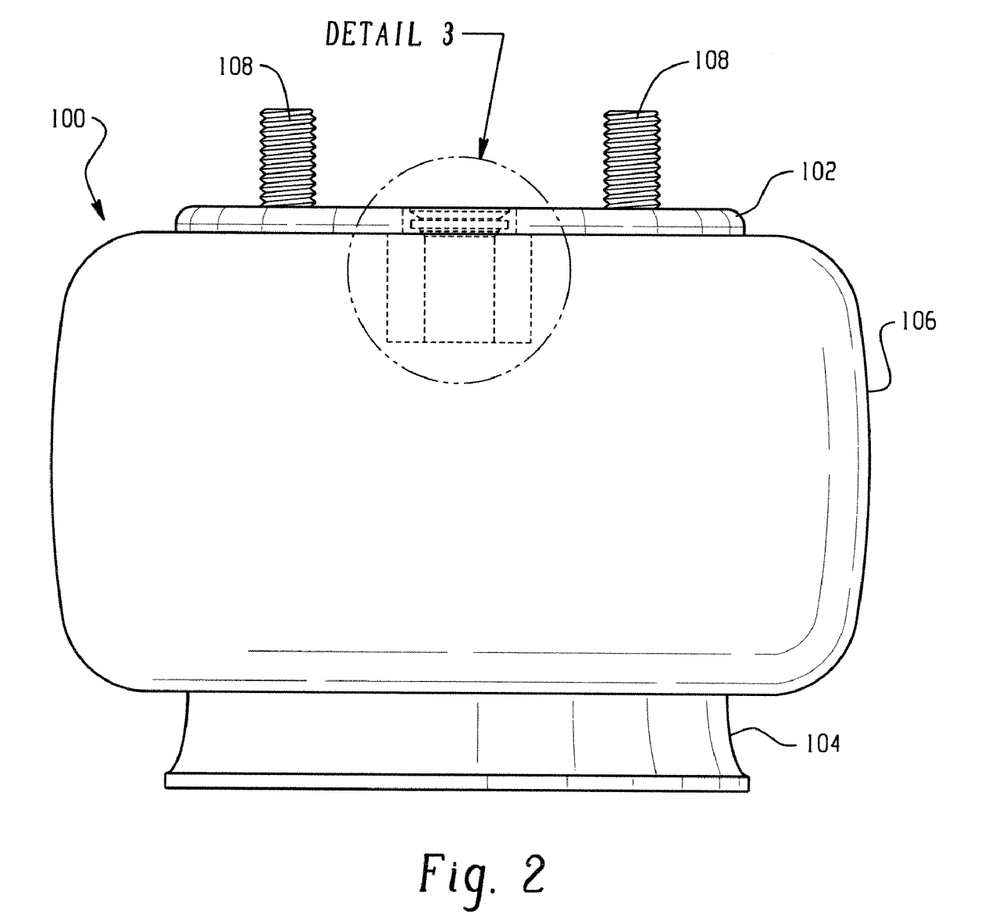
FIG. 2 is a side elevation view of one exemplary embodiment of an air spring and fitting assembly in accordance with the present novel concept.

Referring now in greater detail to FIGS. 2-15, wherein the showings are for the purposes of illustrating exemplary embodiments of the subject novel concept only, and not for the purposes of limiting the same, FIG. 2 illustrates an air spring and fitting assembly 100 in accordance with the present novel concept. Air spring and fitting assembly 100 includes an air spring (not numbered) having a first end member, such as a bead plate 102, for example, and a second end member, such as a piston 104, for example, spaced from the first end member. A flexible wall 106 is disposed between the bead plate and piston and can be secured thereto in any suitable manner. The flexible wall at least partially defines a spring chamber (not shown) formed therewithin between the opposing end members. A suitable mounting arrangement, such as mounting studs 108, for example, are provided and extend from bead plate 102. Additionally, it will be appreciated that the rolling lobe-type air spring shown and described herein is merely exemplary of a suitable air spring, and that any other suitable type, kind and/or configuration of an air spring can alternately be used.

Figure 3:
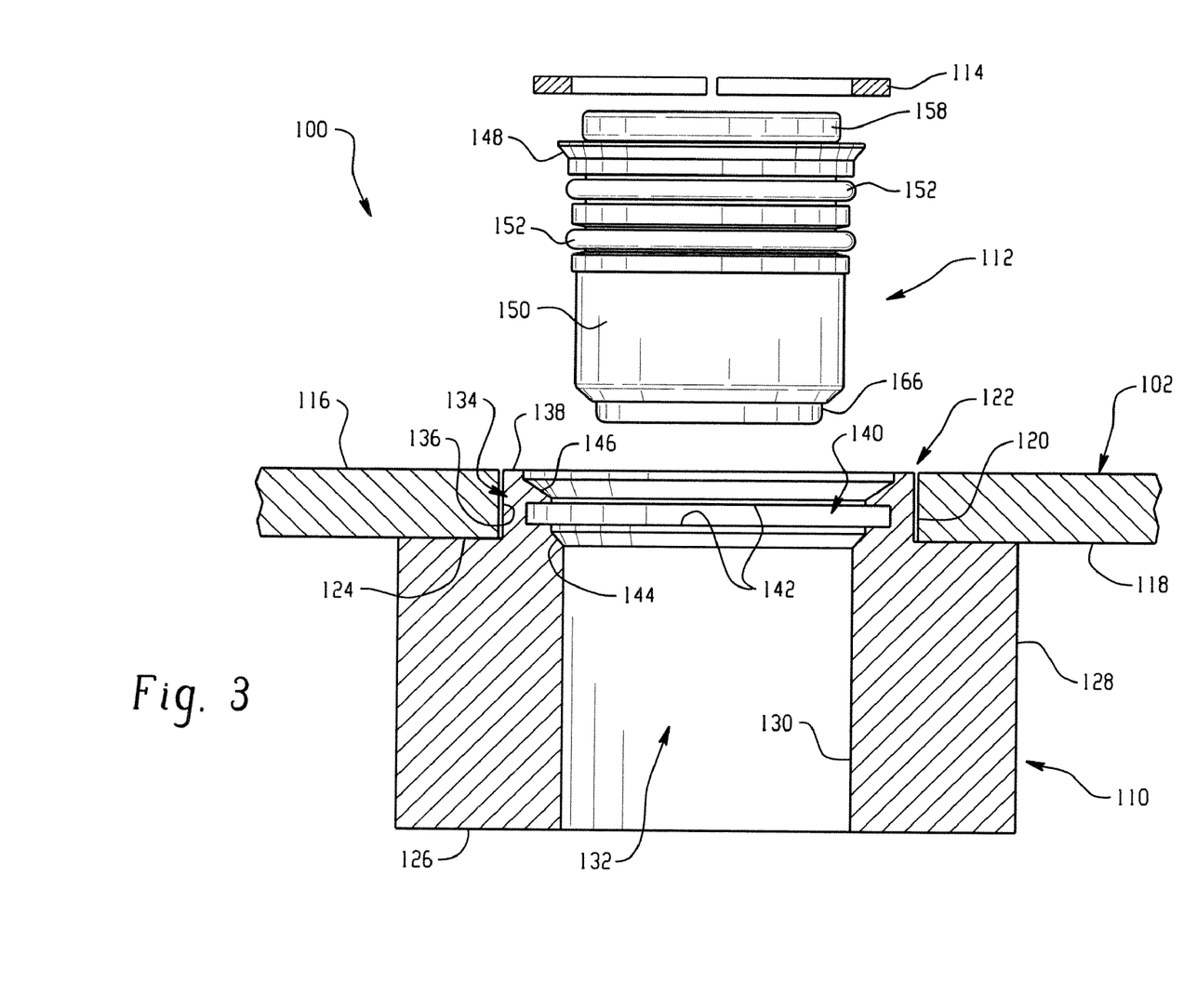
FIG. 3 is an enlarged and exploded side view, in partial cross section, of the air spring and fitting assembly in DETAIL 3 of FIG. 2.
Figure 4:
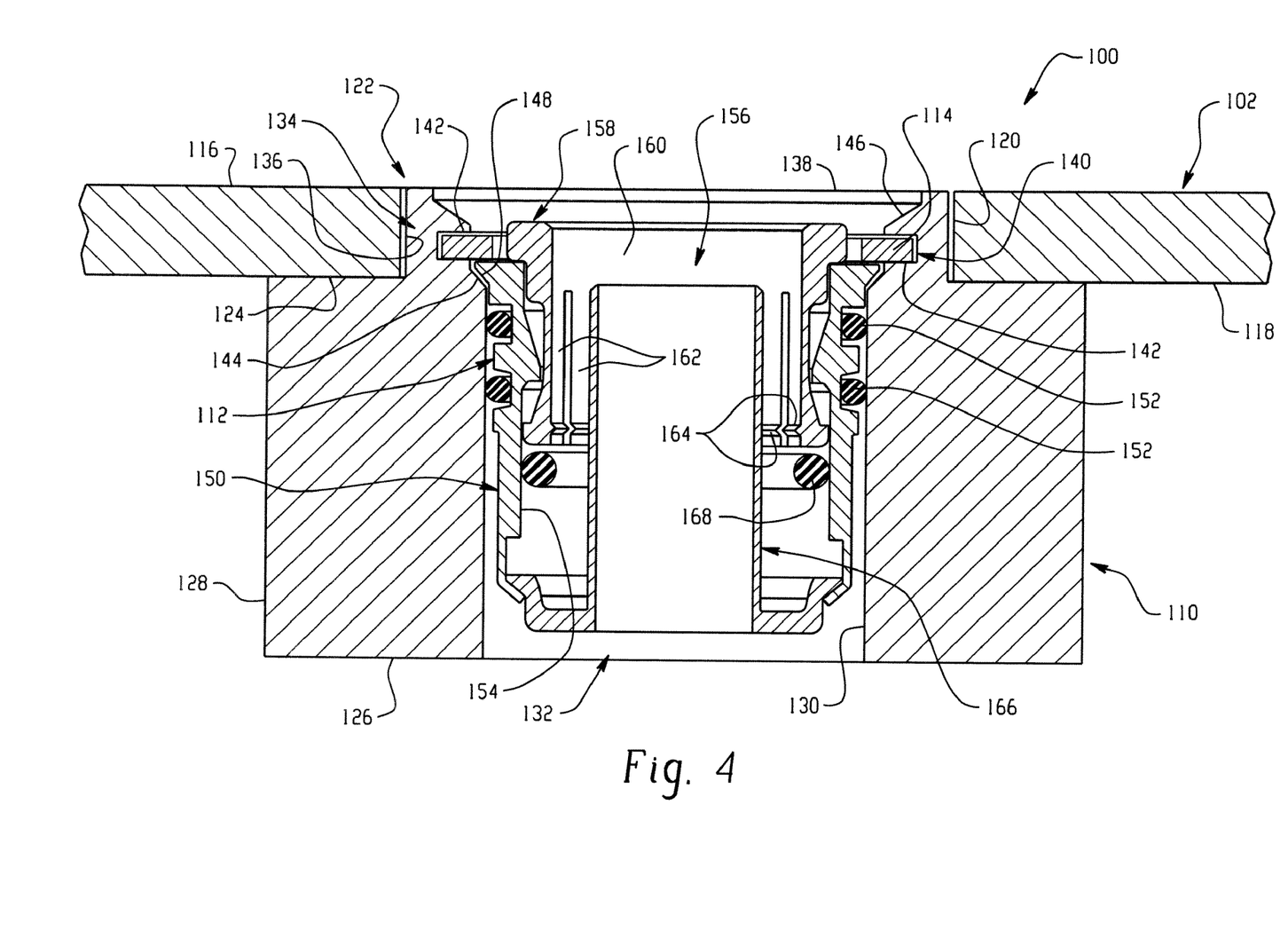
FIG. 4 is a cross-sectional side view of the air spring and connector assembly in FIG. 3 shown in an assembled condition.

FIGS. 3 and 4 illustrate air spring and fitting assembly 100 in further detail. More specifically, FIG. 3 shows bead plate 102 and a cartridge housing 110 in cross section and prior to assembly with a cartridge fitting 112 and a retaining member, such as retaining ring 114, for example. Bead plate 102 includes an outer surface or wall 116, an inner surface or wall 118, and an opening wall 120 forming an opening 122 through the bead plate.

Cartridge housing 110 includes a top wall 124 and an opposing bottom wall 126. In the embodiment shown in FIGS. 3 and 4, cartridge housing 110 is substantially cylindrical and includes a cylindrical side wall 128. However, it will be appreciated that any suitable shape and/or configuration can alternately be used. The cartridge housing also includes a housing inner wall 130 defining a housing passage 132 extending through the cartridge housing. Additionally, a pilot 134 projects outwardly from top wall 124 and includes a pilot side wall 136 and a pilot end wall 138.

A plurality of geometric features and surfaces are formed along housing inner wall 130 toward top wall 124 and pilot 134. In the exemplary embodiment shown in FIGS. 3 and 4, a radially outwardly extending groove 140 is formed along housing passage 132 between spaced-apart groove walls 142. Additionally, a cartridge seating surface 144 is formed adjacent groove 140 but spaced therefrom toward bottom wall 126. Optionally, a feature, such as a frustoconical relief 146, for example, can be provided adjacent groove 140 opposite seating surface 144 that may be useful for manufacturing or assembly purposes, such as for facilitating installation of cartridge fitting 112 and retaining ring 114 on the cartridge housing, for example.

As can be better seen in FIG. 4, cartridge fitting 112 is received into cartridge passage 132 of cartridge housing 110 such that a radially outwardly extending flange 148 of cartridge body 150 engages seating surface 144 thereby supporting the cartridge fitting on the cartridge housing. Retaining ring 114 is fitted into groove 140 thereby capturing flange 148 and retaining cartridge fitting 132 within the cartridge housing. One or more sealing members, such as o-rings 152, for example, are sealingly positioned between cartridge body 150 and housing inner wall 130 forming a substantially fluid-tight seal therebetween.

Cartridge body 150 includes an inside wall 154 at least partially defining a fitting passage 156 extending therethrough. A retaining collet 158 is received within fitting passage 156, and includes a collet base wall 160 and a plurality of retaining fingers 162. A radially inwardly extending projection 164 is formed on the retaining fingers and is useful for engaging the associated outside surface of the associated air line or supply tube. An inner support sleeve 166 is disposed within fitting passage 156 and is suitable for being received inside the associated air line. A sealing member, such as an o-ring 168, is also provided within fitting passage 156 and is suitable for forming a substantially fluid-tight seal between the associated outside surface of the associated air line and inside wall 154 of cartridge body 150. It will be appreciated that the structure and operation of cartridge fittings, such as cartridge fitting 112, for example, are generally well known. One example of a suitable cartridge fitting is commercially available under the designation Prestomatic Removeable Tank Cartridges from Parker Hannifin Corporation, Parker Brass Products Division of Otsego, Mich.

Figure 5:
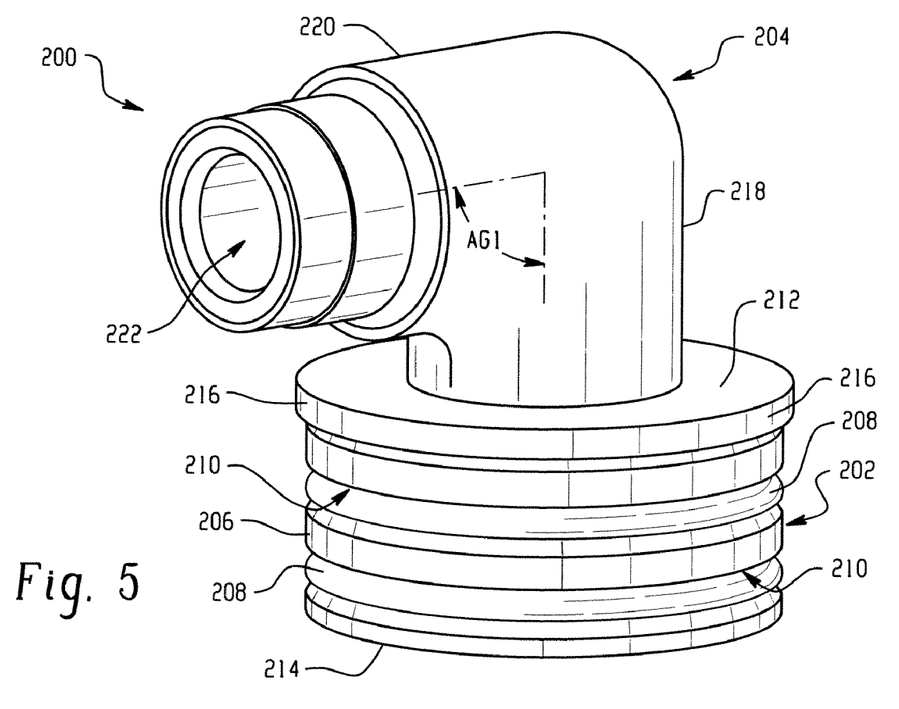
FIG. 5 is a perspective view of an alternate embodiment of a fitting suitable for use in forming an air spring and fitting assembly in accordance with the present novel concept.

Another embodiment of a suitable cartridge fitting 200 is shown in FIG. 5, and includes a cartridge body portion 202 and a connector portion 204. Cartridge fitting 200 is suitable for use with a cartridge housing, such as cartridge housing 110 described above, for example, and will be discussed with reference thereto. Cartridge body portion 202 includes an outer wall 206 dimensioned to be received within a housing passage, such as housing passage 132 of cartridge housing 110, for example, and includes one or more sealing members, such as o-rings 208, for example, supported along outer wall 206 for forming a substantially fluid-tight seal with an inner wall of a cartridge housing, such as housing inner wall 130, for example. One or more grooves 210 can optionally be provided along outer wall 206 for receiving o-rings 208. Additionally, body portion 202 includes a top wall 212, a bottom wall 214 and a radially outwardly extending flange portion 216 extending from outer wall 206 adjacent top wall 212. Flange portion 216 is generally suitable for engaging seating surface 144 of cartridge housing 110.

Connector portion 204 extends from body portion 202, and includes a first section 218 and a second section 220 disposed at an angle AG1 relative to first section 218. A fitting passage 222 extends through connector portion 204 and body portion 202, and is suitable for placing an associated air line (not shown) secured on the connector portion in communication with an associated spring chamber of an associated air spring. A retaining collet 224 and a sealing member (not shown) are provided on the end of second section 220 for securing the associated air line within the fitting passage as discussed above with regard to cartridge fitting 112, for example.

Figure 6:
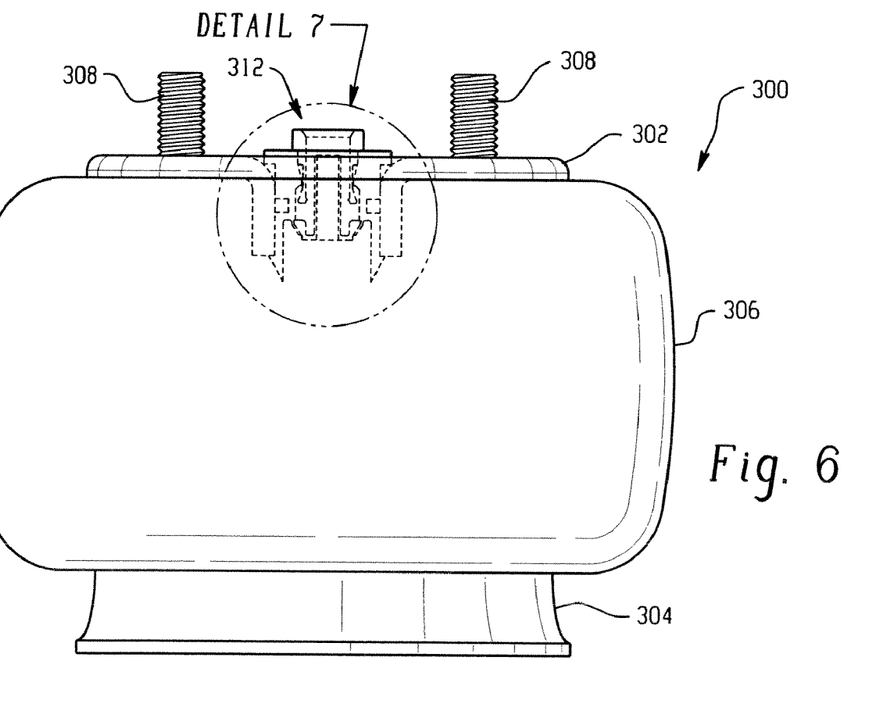
FIG. 6 is a side elevation view of another exemplary embodiment of an air spring and fitting assembly in accordance with the present novel concept.

Another embodiment of an air spring and fitting assembly 300 in accordance with the present novel concept is shown in FIG. 6. Air spring and fitting assembly 300 includes an air spring (not numbered) having a first end member, such as a bead plate 302, for example, and a second end member, such as a piston 304, for example, spaced from the first end member. A flexible wall 306 is disposed between the bead plate and piston, and can be secured thereto in any suitable manner. The flexible wall at least partially defines a spring chamber (not shown) formed therewithin between the opposing end members. A suitable mounting arrangement, such as mounting studs 308, for example, are provided and extend from bead plate 302. Additionally, it will be appreciated that the rolling lobe-type air spring shown and described herein is merely exemplary of a suitable air spring, and that any other suitable type, kind and/or configuration of an air spring can alternately be used.

Figure 7:
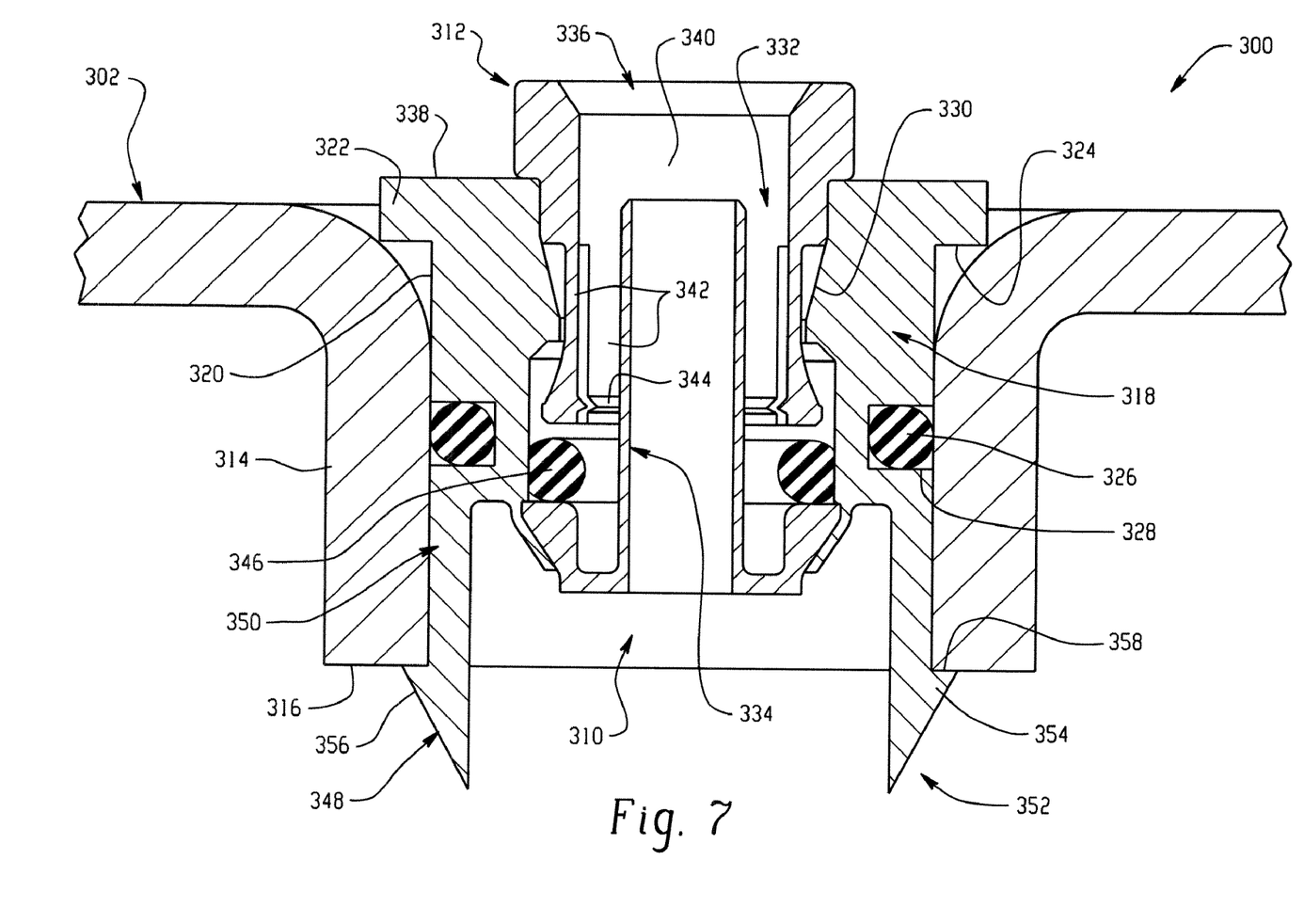
FIG. 7 is an enlarged cross-sectional side view of the air spring and fitting assembly in DETAIL 7 of FIG. 6.
Figure 8:
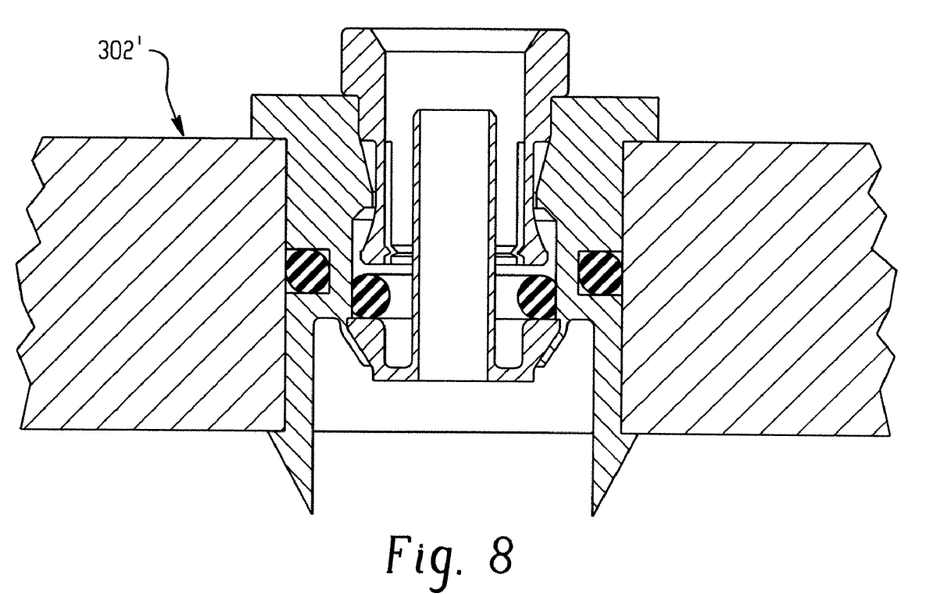
FIG. 8 is a cross-sectional side view of an alternate embodiment of the air spring and fitting assembly in FIGS. 6 and 7.

As shown in further detail in FIG. 7, bead plate 302 includes an opening 310 formed therethrough with a connector fitting 312 secured therealong. In the embodiment shown in FIG. 7, bead plate 302 is formed from substantially thin-walled sheet material having a nominal wall thickness that is substantially less than the length of fitting 312. As such, opening 310 is formed through bead plate 302 by deforming a portion of the bead plate sheet material into a side wall 314 that defines opening 310. Thus, the side wall extends from bead plate 302 into the spring chamber (not shown) and terminates at an end wall 316. An alternate arrangement is shown in FIG. 8 in which a bead plate 302' is formed from a material having a substantially greater thickness than that of bead plate 302 in FIG. 7. This increased thickness is approximately equivalent to the length of side wall 314 in FIG. 7, such that connector fitting 312 can be suitably installed thereon. Thus, it will be appreciated that any suitable wall thickness and/or construction of an end member can be used departing from the principles of the present novel concept.

Returning to FIG. 7, connector fitting 312 includes a fitting body 318. The fitting body includes an outer wall 320 and a radially outwardly extending flange 322 forming a shoulder surface 324. A sealing member, such as an o-ring 326, for example, is disposed between fitting body 318 and side wall 314 forming a substantially fluid-tight seal therebetween. Optionally, a radially inwardly extending groove 328 can be formed on the fitting body for receiving and retaining o-ring 326.

Fitting body 318 also includes an inside wall 330 that at least partially defines a fitting passage 332 extending through the fitting body. An inner support sleeve 334 is received within fitting passage 332 and is supported therein on fitting body 318. Additionally, a retaining collet 336 is received within fitting passage 332 and is supported on fitting body 318 toward an outer end wall 338 thereof. Collet 336 includes a collet base wall 340 and a plurality of retaining fingers 342 extending from the collet base wall. The retaining fingers include radially inwardly extending projections 344 formed along the free ends thereof suitable for gripping or otherwise interengaging the outer surface of an associated air line. Additionally, a sealing member, such as an o-ring 346, for example, is disposed within fitting passage 322 between support sleeve 334 and retaining collet 336, and is suitable for forming a substantially fluid-tight seal between inside wall 330 of fitting body 318 and the associated outer surface of the associated air line.

Figure 9:
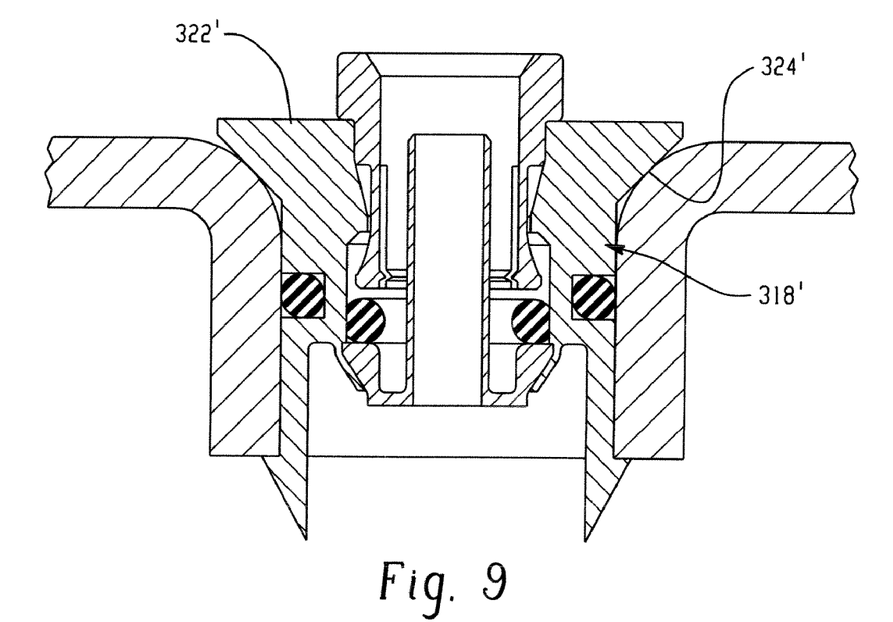
FIG. 9 is a cross-sectional side view of another alternate embodiment of the air spring and fitting assembly in FIGS. 6 and 7.

Connector fitting 312 is received in opening 310 such that one of flange 322 and shoulder surface 324 engage bead plate 302, which thereby prevents the connector fitting from passing through opening 310. To prevent the inadvertent removal of connector fitting 312 from opening 310, a plurality of retaining members 348 extend from fitting body 318 and engage end wall 316. In one exemplary embodiment, the plurality of retaining members are substantially evenly spaced around the circumference or periphery of the fitting body. However, it will be appreciated that any suitable arrangement and/or configuration of retaining members can alternately be used. The retaining members include a first or attached end 350 extending from fitting body 318, and a second or free end 352 opposite the attached end. Additionally, a projection 354 extends radially outwardly from along the free end of the retaining members and includes a frustoconical or otherwise tapered surface 356 and a shoulder 358 suitable for engaging end wall 316. Preferably, retaining members 348 are resiliently deflectable such that free ends 352 can be radially inwardly displaced as surfaces 356 engage the bead plate during insertion of connector fitting 312 into opening 310. Once the connector fitting has been sufficiently displaced or inserted into the opening, projections 354 of retaining members 348 pass through the opening beyond end wall 316 and return to a radially outwardly biased position in which shoulders 358 engage end wall 316 and prevent the inadvertent removal of the connector fitting from opening 310. An alternate embodiment of fitting body 318 is shown in FIG. 9 as fitting body 318', which includes a flange 322' and a frustoconical surface 324' instead of the generally rectangularly shaped flange and shoulder surface of fitting body 318.

Figure 10:
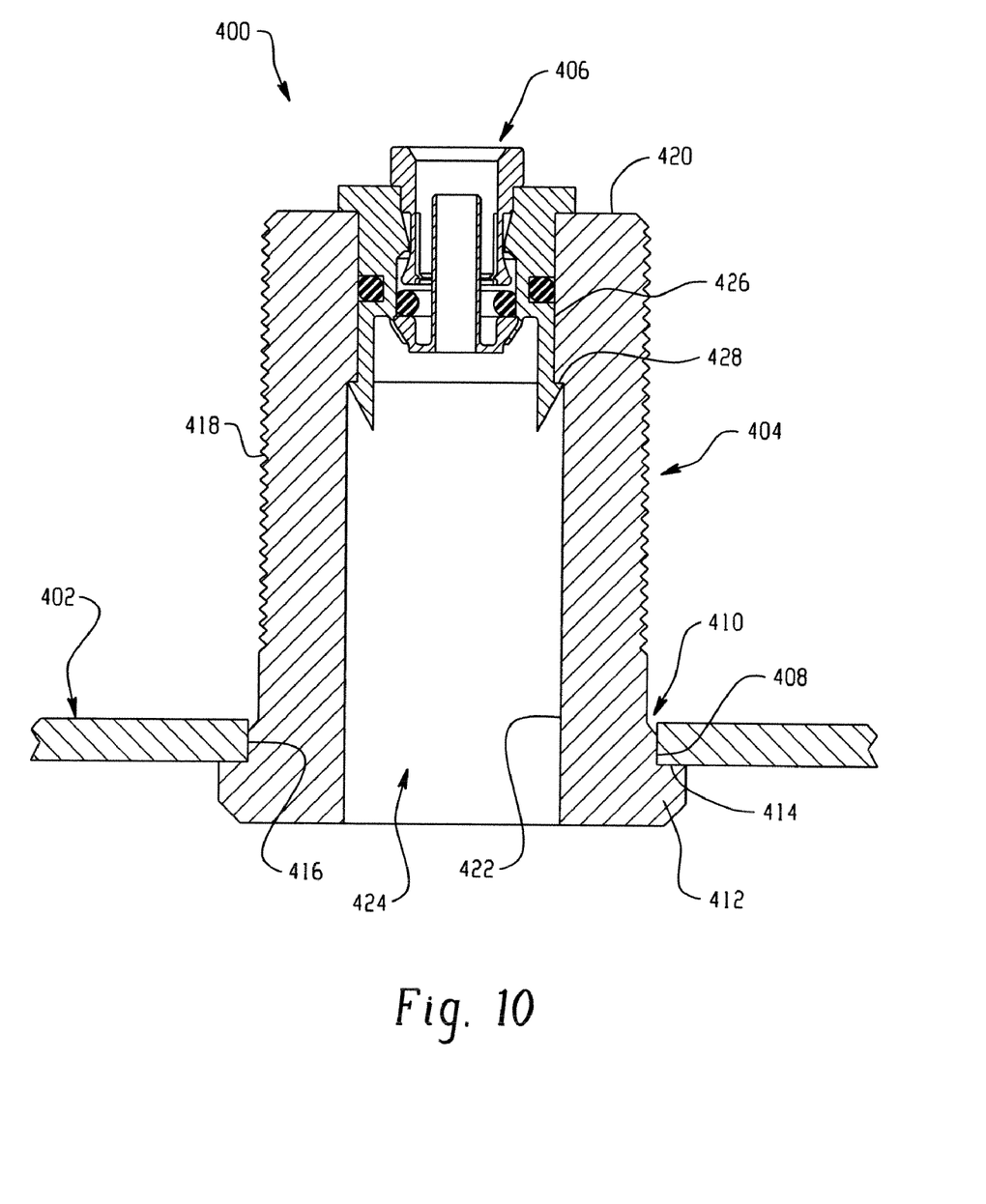
FIG. 10 is a cross-sectional side view of still another alternate embodiment of the air spring and fitting assembly in FIGS. 6 and 7.

Another alternate embodiment of an air spring and fitting assembly 400 in accordance with the present novel concept is shown in FIG. 10. Air spring and fitting assembly 400 includes a bead plate 402, a mounting stud 404 and a connector fitting 406. Bead plate 402 includes an opening wall 408 defining an opening 410 extending through the bead plate. Mounting stud 404 includes a flange portion 412 extending radially outwardly beyond opening 410 and forming a shoulder 414 with a pilot portion 416 suitable for being received within opening 410. Mounting stud 404 also includes a threaded portion 418 extending outwardly from bead plate 402 toward an end wall 420. An inside wall 422 forms a fluid passage 424 through mounting stud 404, and includes a radially inwardly stepped wall portion 426 forming a shoulder 428 therein. Connector fitting 406 extends into passage 424 and engages shoulder 428 to secure the connector fitting thereon. Additionally, a sealing member, such as an o-ring (not shown), for example, can be included on the connector fitting to form a substantially fluid-tight seal along inside wall 422 within passage 424.

Figure 11:
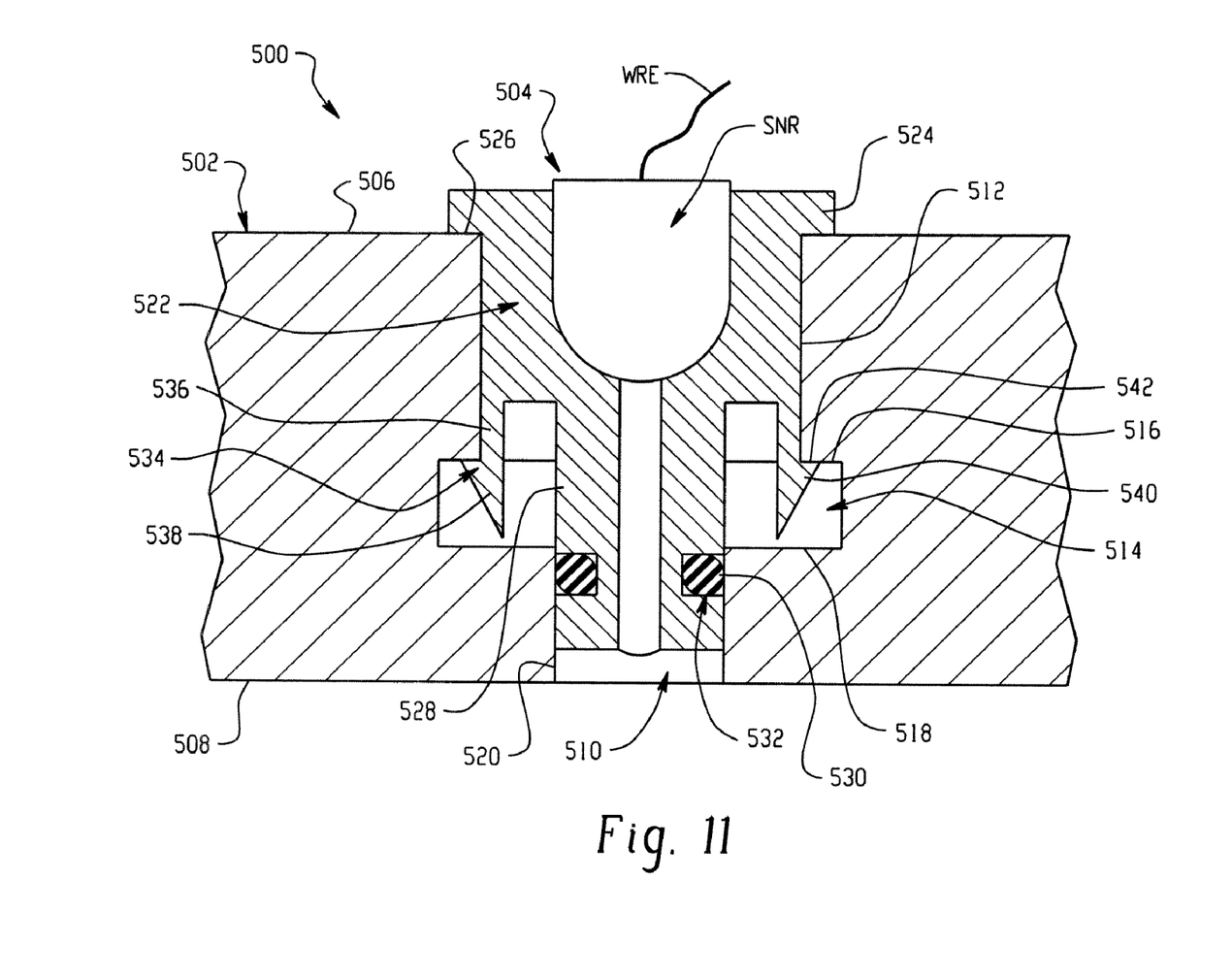
FIG. 11 is a cross-sectional side view of an exemplary embodiment of a fitting in accordance with the present novel concept.
Figure 12:
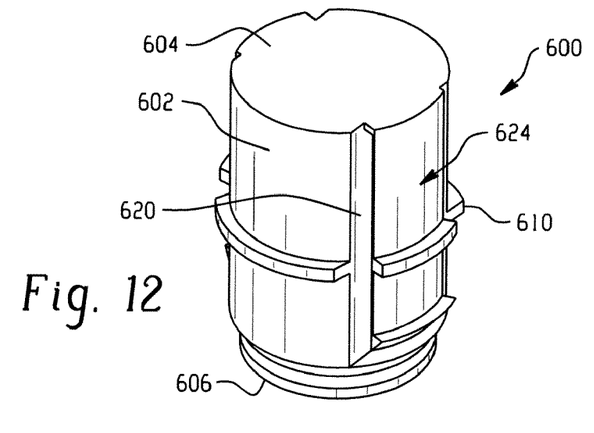
FIG. 12 is a perspective view of another exemplary embodiment of a fitting in accordance with the present novel concept.
Figure 13:
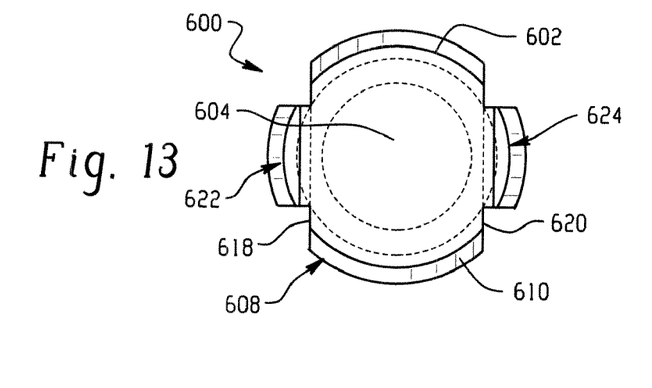
FIG. 13 is a top view of the fitting shown in FIG. 12.
Figure 14:
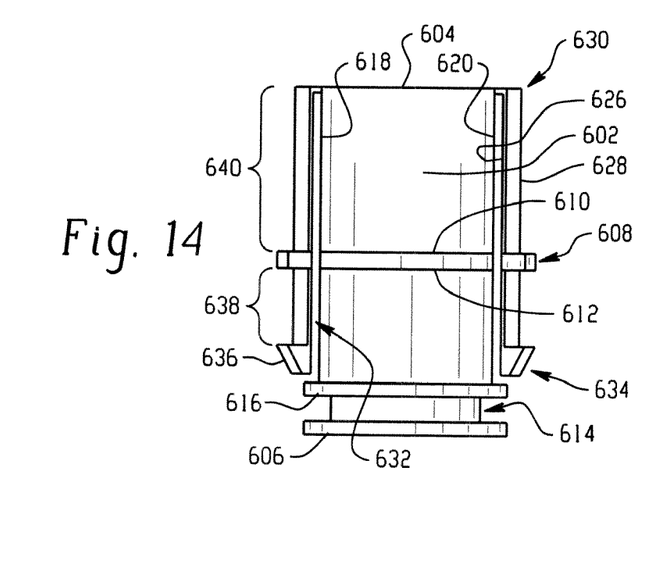
FIG. 14 is front view of the fitting shown in FIG. 12.
Figure 15:
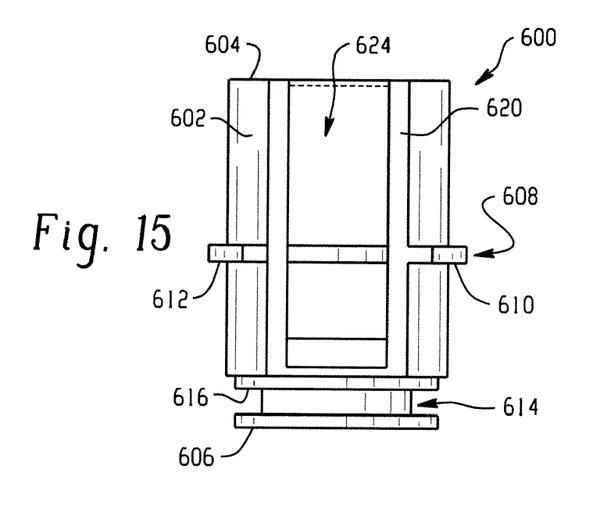
FIG. 15 is side view of the fitting shown in FIG. 12.

FIG. 11 illustrates another embodiment of an air spring and fitting assembly 500 in accordance with the present novel concept. Air spring and fitting assembly 500 includes an air spring (not shown) having an end member, such as a bead plate 502, for example. Air spring and fitting assembly 500 also includes a connector fitting 504 secured on the bead plate of the air spring. Bead plate 502 includes an outside wall or surface 506 and an opposing inside wall or surface 508. A passage 510 is formed through bead plate 502 by a passage wall 512. A radially outwardly extending retaining groove 514 is formed on passage wall 512 between groove walls 516 and 518. Additionally, passage wall 512 includes a sealing portion 520 that has a reduced diameter suitable for forming a substantially fluid-tight seal with connector fitting 504.

Connector fitting 504 includes a sensor SNR, such as a temperature, pressure or height sensor, for example, having a wire WRE or other electrical lead that extends from the sensor. Connector fitting 504 also includes a connector body 522 formed around sensor SNR in a suitable manner, such as by using an injection molding process to overmold the connector body on the sensor, for example. Connector body 522 includes a radially outwardly extending flange portion 524 that forms a shoulder surface 526 engaging outer wall 506 of bead plate 502. Connector body 522 also includes an elongated sealing portion 528 and a sealing member, such as an o-ring 530, for example, disposed along the sealing portion and forming a substantially fluid-tight seal between sealing portion 528 of fitting body 522 and sealing portion 520 of passage wall 512. A groove 532 can optionally be provided along sealing portion 528 for receiving o-ring 530. Additionally, a plurality of retaining members 534 extend from fitting body 522 and include a first or attached end 536 and a second or free end 538. A barb 540 is provided along free end 538 and includes a shoulder portion 542 engaging groove wall 516 to secure connector fitting 504 on bead plate 502. Free end 538 is resiliently deflectable to permit installation of the connector fitting on the bead plate, and is capable of returning to a radially outwardly biased position such that barbs 540 can engage the opposing side of the bead plate and secure the connector fitting thereon.

Still another embodiment of a connector fitting 600 in accordance with the present novel concept is shown in FIGS. 12-15. It will be appreciated that certain embodiments of the connector fittings shown and described hereinbefore can be more difficult than others to remove and/or replace, after being installed on an end member of an air spring. For example, embodiments discussed above that include retaining members that extend axially into the fitting passage in the end member and include a projection or barb that engages an inner wall or surface of the end member can be particularly difficult to remove from the end member of the air spring. Connector fitting 600, however, is capable of being easily removed from an end wall of an air spring, once it has been installed thereon. This can be beneficial in certain applications where inspection, repair and/or replacement of the connector fitting and/or component thereof is desirable.

Additionally, it will be appreciated that connector fitting 600 is shown in FIGS. 12-15 without reference to any particular internal structure or features thereof, and will be described herein without any particular reference thereto. As such, it is to be understood that connector fitting 600 is capable of broad use in a wide variety of applications and can include any suitable internal structure and/or components without departing from the principles of the present novel concept. As one example, a connector fitting adapted for easy removal from an end member, such as connector fitting 600, for example, could include a sensor disposed therein with a fitting body formed therearound, such as is shown in connector fitting 504 shown in FIG. 11, for example. As another example, a connector fitting adapted for easy removal from an end member, such as connector fitting 600, for example, could include an inner support sleeve, a sealing member and a retaining collet for receiving an end of a length of associated air line, such as is shown in connector fitting 312 in FIG. 7, for example.

Returning to FIGS. 12-15, connector fitting 600 includes a side wall 602 extending between opposing end walls 604 and 606. A radially outwardly extending flange 608 includes opposing flange walls 610 and 612, and is suitable for engaging a wall or shoulder of an end member, such as outside wall 506 of air spring and fitting assembly 500 in FIG. 11, for example. A radially inwardly extending groove 614 is formed between end wall 606 and a groove wall 616 spaced therefrom. Opposing flats 618 and 620 are formed along side wall 602, and retaining members 622 and 624 are disposed along the exterior of the connector fitting adjacent flats 618 and 620, respectively.

Retaining members 622 and 624 each include an inner surface or wall 626 and an outer surface or wall 628 generally opposite the inner surface or wall. Retaining members 622 and 624 are supported on the connector fitting at an attachment end 630 thereof and are oriented such that the inner walls 626 are disposed toward flats 618 and 620. The retaining members are spaced from the body of the connector fitting such that a gap 632 is formed between flats 618 and 620 and corresponding inner walls 626. The retaining members include a free end 634 opposite attachment end 630, and a projection 636 extends radially outwardly from the retaining members along the free ends thereof. In one exemplary embodiment, outer walls 628 are formed with the same curvature as the other portions of the body. However, it will be appreciated that any suitable shape can be used.

In use, connector fitting 600 is received on an end member of an air spring, such as end member 502, for example. In one exemplary embodiment, connector fitting 600 is received in the opening or passage formed in the end member, such as passage 510, for example, such that flange 608 is in abutting engagement with the end member. As such, a retaining portion 638 between the flange and the projections is received within the fitting passage, and an outer portion 640 extends outwardly beyond the fitting passage of the end member. To remove the connector fitting from the fitting passage, free ends 634 of the retaining members are forced radially inwardly to release projections 636 from a suitable groove or shoulder formed along the fitting passage. The retaining members can be displaced in such a manner by squeezing the exposed portion of the retaining members extending along outer portion 640. As such, connector fitting 600 can be selectively removed from the end member.

The present novel concept, as shown and described with reference to the foregoing exemplary embodiments, can be used to overcome one or more problems and disadvantages existing in known constructions and arrangements. For example, the costs associated with manufacturing threaded components can be reduced by eliminating the threads on the fitting and corresponding part. As another example, the difficulties associated with installing and/or repairing air springs, especially in areas of reduced clearance, can also be minimized by utilizing the present novel concept, such as one of the foregoing embodiments, for example. That is, the elimination of the threaded connection coupled with the low-profile construction and push-in or snap-in design can result in quicker and easier installation and reduced or minimized clearance related problems.

Another advantage that is associated with the use of the present novel concept relates to the production and inventory of air spring components. More specifically, it will be appreciated that air lines of a variety of sizes are commonly used in association with air spring assemblies. For example, otherwise identical air springs might have different threaded passages to receive different sized threaded fittings, such as ⅜" NPT, ½" NPT, ¾" NPT and/or similar metric thread sizes, for example. By utilizing a connection arrangement in accordance with the present novel concept, air spring components having a single diameter hole or bore can be manufactured. Fittings having the same external dimensions but having different sized internal arrangements to receive different sized tubing or sensors can be used. Thus, the number of variations of air spring components can be reduced.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. An air spring assembly comprising:
   a first end member including a first side, an opposing second side and an opening extending therethrough;

a second end member disposed in spaced relation to said first end member and in facing relation to said first side thereof such that a longitudinally-extending axis is formed therebetween;

a flexible wall secured between said first and second end members and at least partially defining a spring chamber between said first side of said first end member and said second end member;

a connector fitting at least partially received within said opening and in fluid communication with said spring chamber, said connector fitting including:

a fitting body extending longitudinally between opposing first and second ends;

first and second retaining members extending longitudinally along said fitting body in radially outwardly-spaced relation thereto such that a gap is formed between said fitting body and said first and second retaining members, said first and second retaining members including a fixed end and an opposing free end, said fixed end operatively connected to said fitting body toward said first end thereof, and said free end being capable of resilient deflection toward said fitting body and including a radially-outwardly extending projection adapted to interengaging said first end member; and, a radially outwardly-extending flange formed on at least one of said fitting body, said first retaining member and said second retaining member, said flange being disposed in an intermediate longitudinal position between said fixed end and said free end of said first and second retaining members such that a longitudinally-extending retaining portion of said connector fitting is formed between said flange and said projection and such that an outer portion of said connector fitting is formed longitudinally outwardly of said flange toward said first end of said fitting body; and, a sealing member sealingly disposed between said connector fitting and said first end member;

said connector fitting interengaging said first end member such that said retaining portion is at least partially disposed between said first and second sides of said first end member and said outer portion is disposed outwardly of said first end member opposite said spring chamber such that a radially-inward force can be applied to said first and second retaining members along said outer portion to radially-inwardly displace said free ends for selective removal of said connector fitting from said first end member.

2. An air spring assembly according to claim 1, wherein said free end of said first and second retaining members is spaced longitudinally inwardly from said second end of said fitting body such that a first portion of said fitting body along said second end thereof extends longitudinally outwardly beyond said free end in a direction generally opposite said flange, and said sealing member is positioned along said first portion of said fitting body.

3. An air spring assembly according to claim 2, wherein one of said first end member and said first portion of said fitting body includes a groove adapted to receive said sealing member.

4. An air spring assembly according to claim 2, wherein said fitting body includes a first longitudinally-extending portion toward said first end with a first cross-sectional dimension and includes a second longitudinally-extending portion toward said second end with a second cross-sectional dimension that is less than said first cross-sectional dimension.

5. An air spring assembly according to claim 4, wherein said first end member includes an opening wall at least partially defining said opening extending through said first end member, said opening wall including a first wall portion and a second wall portion disposed longitudinally-inwardly from said first wall portion toward said first side of said first end member, said first wall portion at least partially defining a first section of said opening that has a first cross-sectional dimension complimentary to said first cross-sectional dimension of said fitting body, and said second wall portion at least partially defining a second section of said opening that has a second cross-sectional dimension complimentary to said second cross-sectional dimension of said fitting body.

6. An air spring assembly according to claim 1, wherein at least said longitudinally-extending retaining portion of said connector fitting has an approximately circular cross-sectional shape with at least a portion of said fitting body, said first retaining member and said second retaining member defining said approximately circular cross-sectional shape, said fitting body including first and second flats extending longitudinally therealong adjacent said first and second retaining members such that said first and second flats at least partially define said gaps between said fitting body and said first and second retaining members.

7. An air spring assembly comprising:

a first end member including a first side, an opposing second side and an opening extending therethrough;

a second end member disposed in spaced relation to said first end member and in facing relation to said first side thereof such that a longitudinally-extending axis is formed therebetween;

a flexible wall secured between said first and second end members and at least partially defining a spring chamber between said first side of said first end member and said second end member;

a connector fitting at least partially received within said opening and in fluid communication with said spring chamber, said connector fitting including:

a fitting body extending longitudinally between opposing first and second ends and at least partially received within said opening;

first and second retaining members extending longitudinally from along said fitting body and at least partially received within said opening, said first and second retaining members including a fixed end and an opposing free end, said fixed end operatively connected to said fitting body, and said free end being capable of resilient deflection and including a radially-outwardly extending projection adapted to interengaging said first end member, said free end spaced longitudinally inwardly from said second end of said fitting body such that a portion of said fitting body along said second end thereof extends longitudinally outwardly beyond said free end; and, a radially outwardly-extending flange at least partially formed along said first and second retaining members and disposed in longitudinally-spaced relation to said fixed end of said first and second retaining members such that said flange is in an intermediate position between said fixed end and said free end and such that a longitudinally-extending retaining portion of said first and second retaining members is formed between said flange and said projection; and, a sealing member sealingly disposed between said connector fitting and said first end member, said sealing member positioned in longitudinally-spaced relation to said free end of said first and second retaining members in a direction generally opposite said flange.

8. An air spring assembly according to claim 7, wherein said second end of said fitting body includes a radially-inwardly extending groove and said sealing member is at least partially received within said groove.

9. An air spring assembly comprising:
a first end member including a first side, an opposing second side and an opening wall at least partially defining an opening extending through said first end member, said opening wall including a first wall portion and a second wall portion disposed longitudinally-inwardly from said first wall portion toward said first side of said first end member;
a second end member disposed in spaced relation to said first end member and in facing relation to said first side thereof such that a longitudinally-extending axis is formed therebetween;
a flexible wall secured between said first and second end members and at least partially defining a spring chamber between said first side of said first end member and said second end member;
a connector fitting at least partially received within said opening and in fluid communication with said spring chamber, said connector fitting including:
a fitting body extending longitudinally between opposing first and second ends;
first and second retaining members extending longitudinally from said fitting body, said first and second retaining members including a fixed end and an opposing free end, said fixed end operatively connected to said fitting body, and said free end being capable of resilient deflection and including a radially-outwardly extending projection adapted to interengaging said first end member, said free end spaced longitudinally inwardly from said second end of said fitting body such that a portion of said fitting body along said second end thereof extends longitudinally outwardly beyond said free end; and,
a radially outwardly-extending flange formed on said fitting body and disposed in longitudinally-spaced relation to said free end of said first and second retaining members such that a longitudinally-extending retaining portion of said connector fitting is formed between said flange and said projection; and,
a sealing member sealingly disposed between said connector fitting and said first end member, said sealing member positioned in longitudinally-spaced relation to said free end of said first and second retaining members in a direction generally opposite said flange;
said first wall portion adapted to receive and interengage said connector fitting on said first end member, and said second wall portion adapted to receive and sealingly engage said second end of said connector fitting.

10. An air spring assembly according to claim 9, wherein said first wall portion at least partially defines a first section of said opening that has a first cross-sectional dimension and said second wall portion at least partially defines a second section of said opening that has a second cross-sectional dimension with said first cross-sectional dimension being greater than said second cross-sectional dimension.

11. An air spring assembly according to claim 10, wherein said first end of said fitting body has a first cross-sectional dimension that is complimentary to said first cross-sectional dimension of said first section of said opening, and said second end of said fitting body has a second cross-sectional dimension that is less than said first cross-sectional dimension of said fitting body and is complimentary to said second cross-sectional dimension of said second section of said opening.

12. An air spring assembly according to claim 9, wherein said opening wall includes a radially-outwardly extending groove formed into said first end member between said first and second wall portions, said groove defining a shoulder wall extending approximately laterally-outwardly from along said first wall portion.

13. An air spring assembly according to claim 12, wherein said connector fitting is received in said opening such that said flange is disposed adjacent said second side of said first end member and said projection on said first and second retaining members operatively interengages said shoulder wall thereby retaining said connector fitting on said first end member.

* * * * *